(12) United States Patent
Gao

(10) Patent No.: US 9,236,094 B2
(45) Date of Patent: Jan. 12, 2016

(54) CD-VINYL RECORD PLAYER

(71) Applicant: Shenzhen Yongjiantai Plastics Molding Co., Ltd., Shenzhen (CN)

(72) Inventor: Jinhong Gao, Shenzhen (CN)

(73) Assignee: Ge Chen, Guangdong (CN)

( * ) Notice: Subject to any disclaimer, the term of this patent is extended or adjusted under 35 U.S.C. 154(b) by 0 days.

(21) Appl. No.: 14/502,988

(22) Filed: Sep. 30, 2014

(65) Prior Publication Data

US 2015/0117171 A1    Apr. 30, 2015

(30) Foreign Application Priority Data

Sep. 30, 2013   (CN) ...................... 2013 2 0608288 U

(51) Int. Cl.
*G11B 25/10*    (2006.01)
*G11B 33/12*    (2006.01)
*G11B 7/0037*   (2006.01)

(52) U.S. Cl.
CPC .............. *G11B 33/125* (2013.01); *G11B 25/10* (2013.01); *G11B 7/0037* (2013.01); *G11B 2220/20* (2013.01)

(58) Field of Classification Search
USPC ........................................................ 720/695
See application file for complete search history.

(56) References Cited

U.S. PATENT DOCUMENTS

| | | | |
|---|---|---|---|
| 3,906,169 A * | 9/1975 | Iwase et al. ........................ 369/1 |
| 4,337,533 A * | 6/1982 | Ando et al. .................... 720/653 |
| 4,429,381 A * | 1/1984 | Paulson ......................... 369/266 |
| 4,470,136 A * | 9/1984 | Takahashi et al. .......... 369/77.11 |
| 4,682,319 A * | 7/1987 | Einhaus ......................... 720/655 |
| 5,031,164 A * | 7/1991 | Rockola et al. ............. 369/30.85 |
| 6,545,953 B1 * | 4/2003 | Herbert ............................. 369/4 |
| 2005/0188395 A1 * | 8/2005 | Liu ................................ 720/696 |

* cited by examiner

*Primary Examiner* — Brian Miller
(74) *Attorney, Agent, or Firm* — Intellectual Property Law Group LLP

(57) ABSTRACT

A CD-vinyl record player comprising a CD door, small turntable, bearing element, record player axle, mini-bearing, big turntable, record player main base, CD motor frame, turntable frame, CD main base, bearing, bearing cover, and CD motor. The CD door is connected to the small turntable through a mini-bearing, and the record player axle is installed in the center of the CD door. The bearing element is above the CD door and connected to the record player axle. The big turntable is above the record player main base. The bottom of the record player main base connects to the turntable frame. The CD motor frame is above CD main base. The bearing is at the center of record player main base, and has the bearing cover on top. The CD motor is at center of the bottom of the turntable frame. The invention combines a vinyl record player and CD player into one player.

2 Claims, 4 Drawing Sheets

CD-VINYL RECORD PLAYER

CROSS-REFERENCE TO RELATED APPLICATION

This application claims priority to China application no. 201320608288.1 filed on Sep. 30, 2013, which is hereby incorporated by reference in its entirety.

BACKGROUND OF THE INVENTION

1. Field of the Invention

The present invention relates to the technical field of record players. Specifically, the present invention relates to the technology of a CD-vinyl record player.

2. Background

With improvement in living standards, modern record players have been improved and once again have become nostalgically fashionable, and have gradually returned to modern consumer life. Modern record players combine modern sound technology with the classical design of vinyl record players, resulting in perfect blend of functionality, style and decorative design, bringing consumers an authentically elegant feel. However, in such existing vinyl record players, there is only the record player, the operation of the player is complicated, and the player does not provide easy music selection functions. Such record players have a playback for a relatively short period of time and do not provide density recording.

SUMMARY OF THE INVENTION

The objective of the present invention is to combine a record player and CD player into a single, simple player that is user friendly and produces a smooth and steady sound.

An embodiment of the present invention is achieved through the following technical solution, which is in accordance with claim 1.

According to an embodiment of the present invention, the CD-vinyl record comprises: a CD door, small turntable, bearing element, record player axle, one or more miniature bearings, big turntable, record player main base, CD motor frame, turntable frame, CD main base, bearing, bearing cover, CD motor; the CD door is connected to the small turntable through a miniature bearing, and a record player axle is installed in the center of the CD door; the bearing element is above the CD door and connected to the record player axle; the bearing is located at the center of record player main base, and has a bearing cover on top; the CD motor is at the center of the bottom of the turntable frame.

According to an embodiment of the present invention, the player comprises two bearings.

Compared with the prior art, embodiments of the present invention have the following advantageous effects: the CD player is in the center of the record player, along with two high performance bearings installed in the center of the main base, which can run smoothly and is driven by a big turntable motor and effectively control the record player swing to achieve the best sound quality of record player. There is a miniature bearing installed on the CD door, which provides power to the small turntable for it to run smoothly and makes the record player axle rotate with the big turntable to ensure smooth playing of the record. The embodiment of the present invention combines a record player and CD player into one player functionally and creatively, having a simple mechanism, simple operation, smooth record playing and good sound quality.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

The CD-vinyl record player of the present invention will be further described in detail with reference to accompanying drawings.

Figure 1:
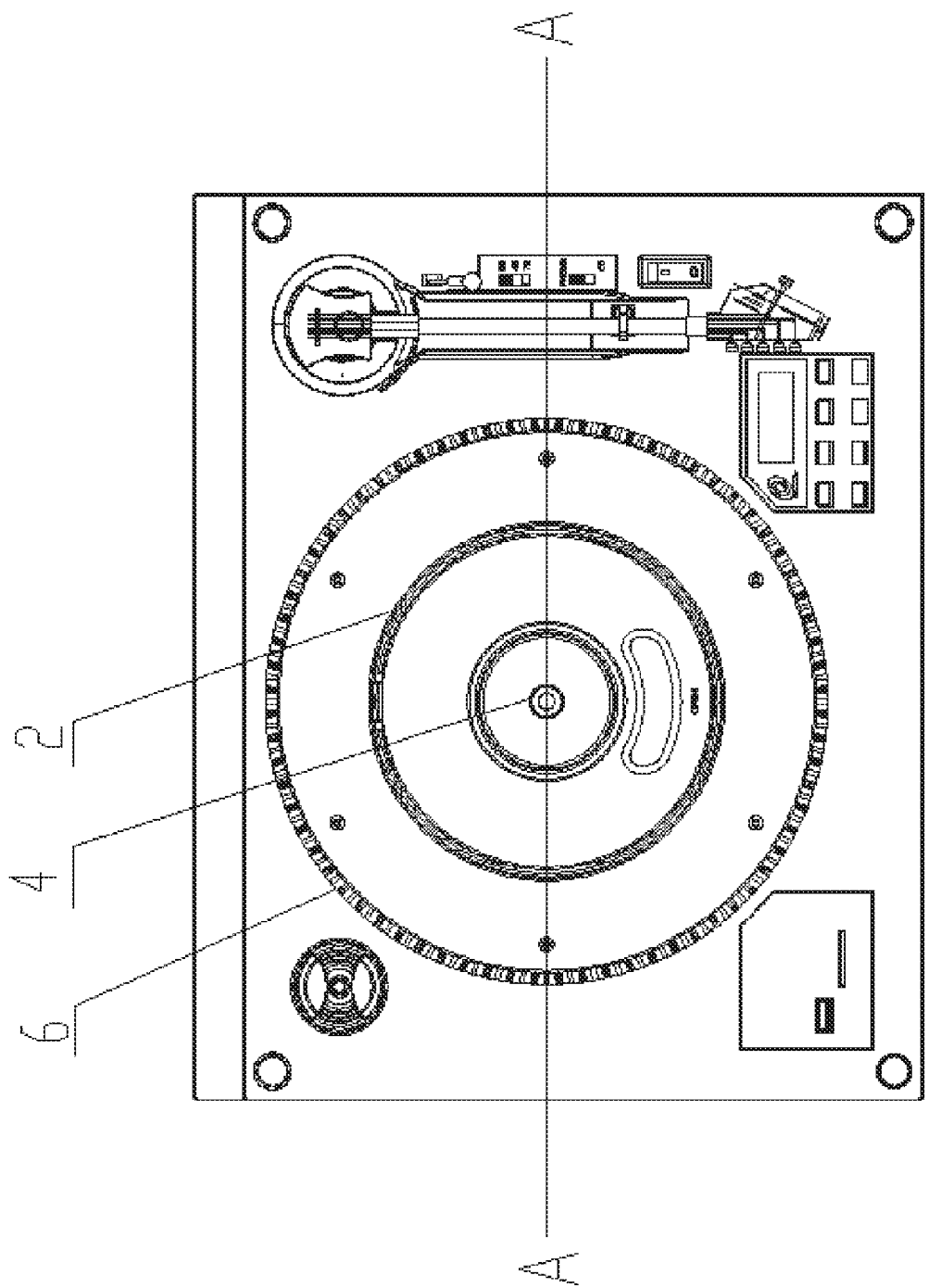
FIG. 1 is a top view of the CD-vinyl record player, according to an embodiment of the present invention.
Figure 2:
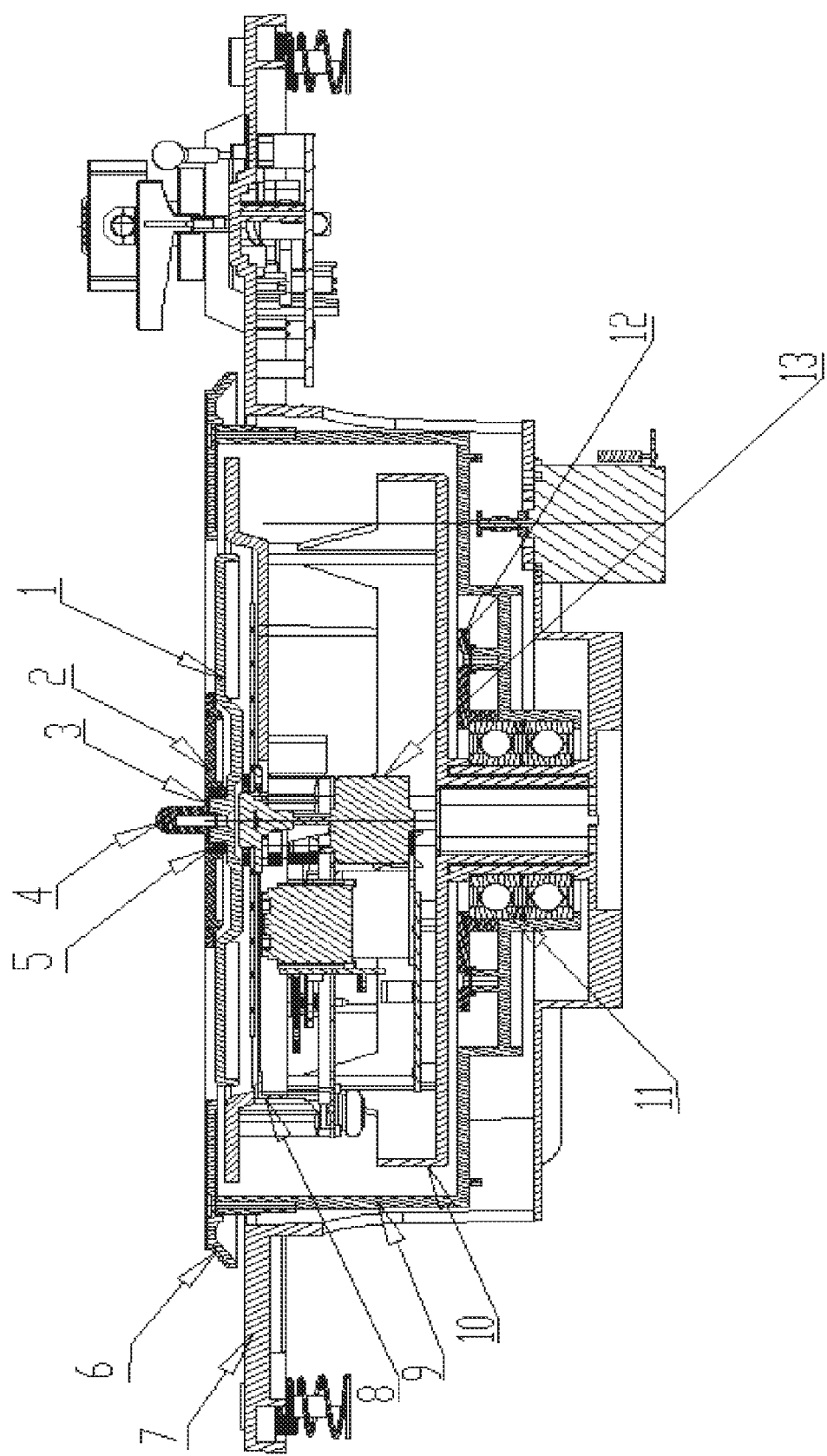
FIG. 2 is a cross-sectional view along the A-A line of FIG. 1.

FIGS. 1 and 2 depict an embodiment of the CD-vinyl record player according to an embodiment of the present invention. The invention comprises a CD door 1, a small turntable 2, bearing element 3, record player axle 4, miniature bearing 5, big turntable 6, record player main base 7, CD motor frame 8, turntable frame (bracket) 9, CD main base 10, bearing 11, bearing cap 12, and CD motor 13.

CD door 1 is connected to small turntable 2 through miniature bearing 5, and the record player axle 4 is installed in the center of CD door 1. The bearing element 3 is positioned above CD door 1 and connected to the record player axle 4. The big turntable 6 is positioned above the record player main base 7. The bottom of the record player main base 7 connects to the turntable frame 9. The CD motor frame 8 is above the CD main base 10. Bearing 11 is at the center of the record player main base 7, and has a bearing cover 12 on top. CD motor 13 is at the center position located at the bottom of turntable frame 9. In the preferred embodiment of the present invention, the player comprises two bearings 11.

Figure 3:
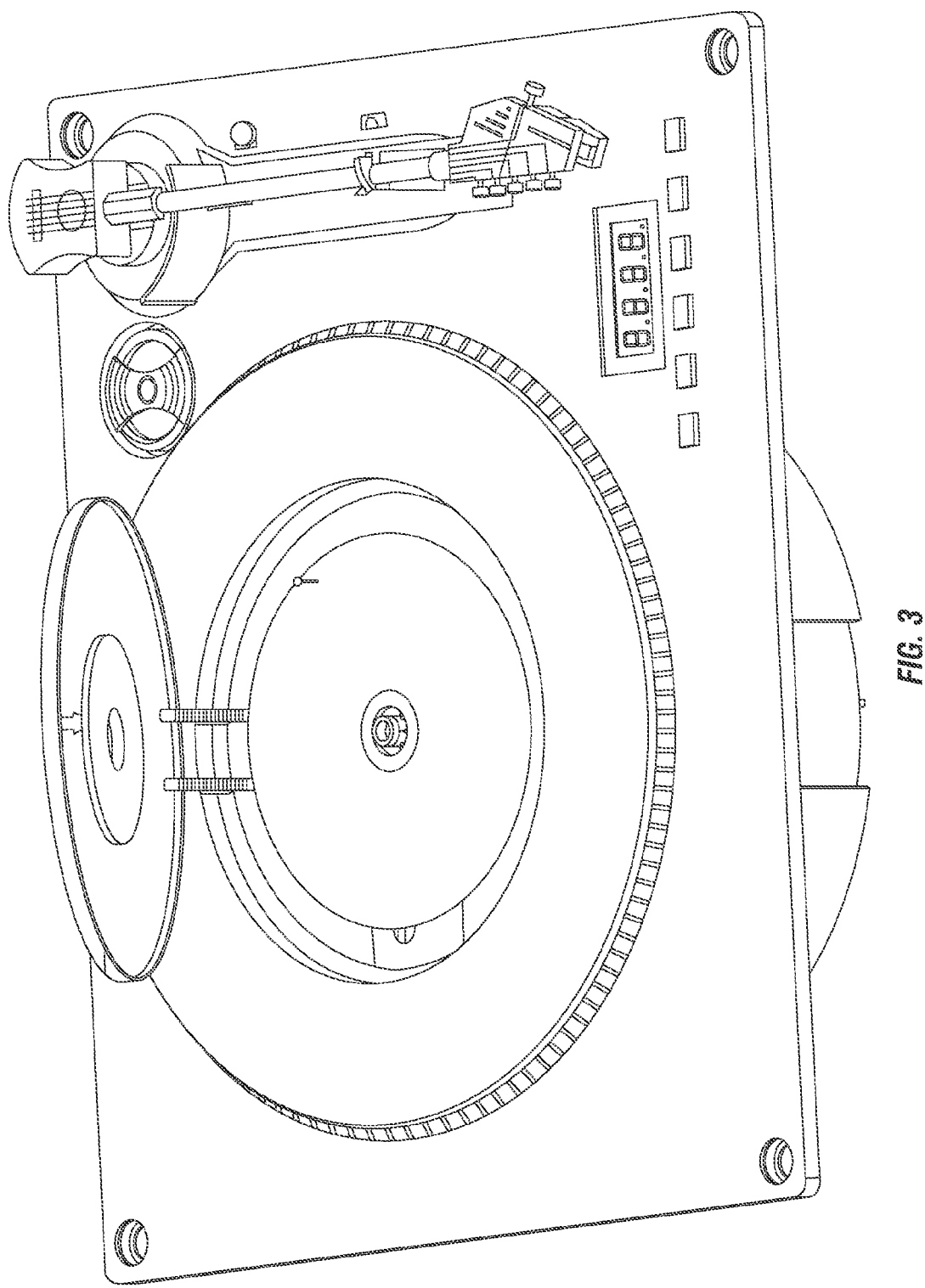
FIG. 3 is a top perspective view of the CD-vinyl record player, according to an embodiment of the present invention.
Figure 4:
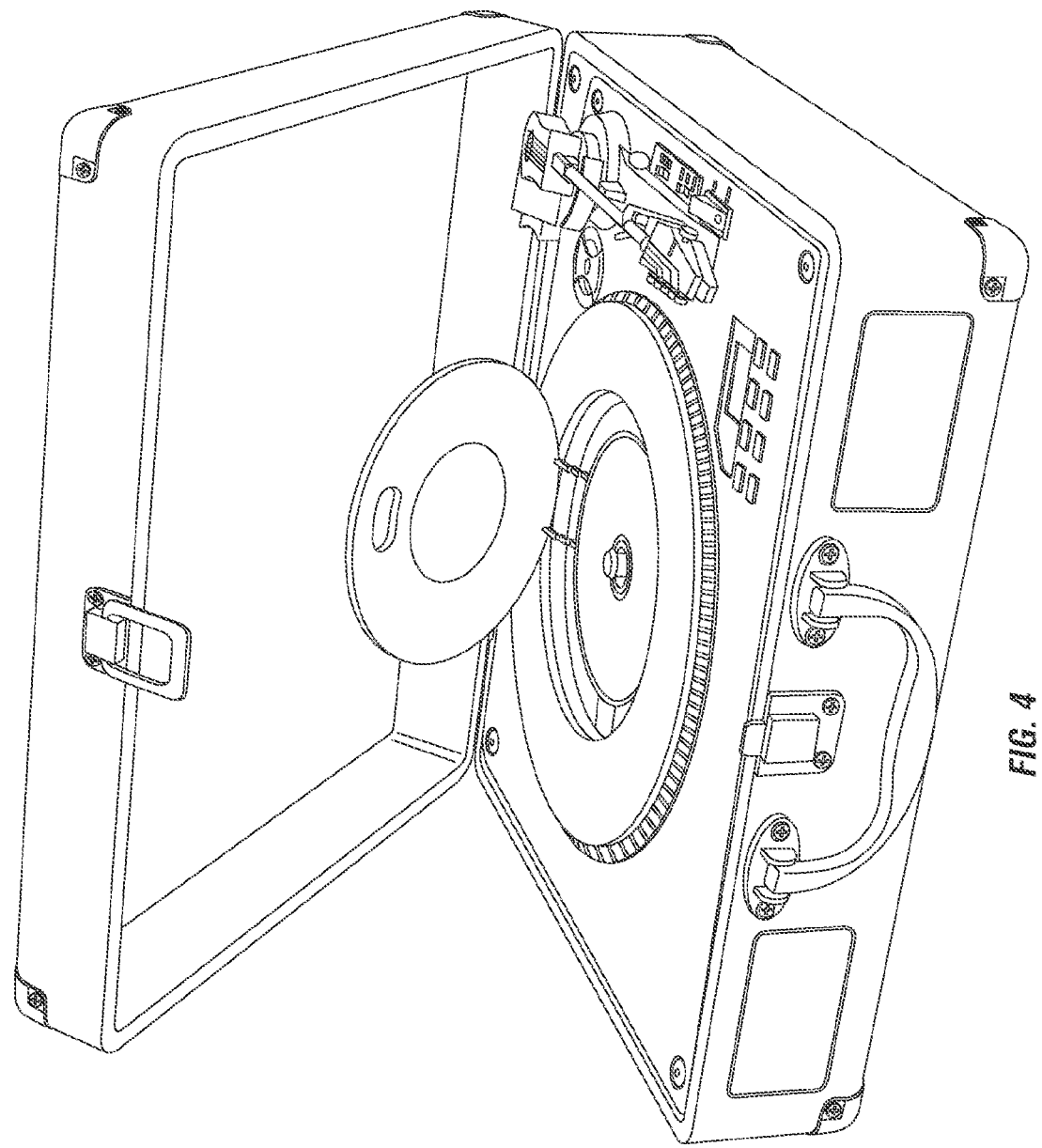
FIG. 4 is a perspective view of the CD-vinyl record player installed in a case, according to an embodiment of the present invention.

FIGS. 3 and 4 illustrate embodiments of the CD-vinyl record player in which FIG. 3 is a top perspective view of the CD-vinyl record player, and FIG. 4 is a perspective view of the CD-vinyl record player installed in a portable case.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A CD-vinyl record player comprising:
   a first turntable;
   a turntable frame;
   a record player main base positioned under said first turntable and a bottom of said record player main base connected to said turntable frame;
   a CD main base installed inside the turntable frame;
   a CD motor frame positioned above said CD main base;
   a CD door above the CD motor frame;
   a record player axle installed in the center of said CD door;
   a CD motor positioned at a center of a bottom of said turntable frame;
   at least one miniature bearing;
   a second turntable that is smaller than the first turntable, wherein said second turntable is connected to said CD door through said miniature bearing;
   a bearing element, positioned above the CD door and connected to said record player axle;
   a bearing positioned at a center of said record player main base; and
   a bearing cover located at a top of said bearing.

2. The CD-vinyl record player of claim 1, further comprising a second bearing positioned next to the first bearing.

* * * * *